(12) United States Patent
Fresnel

(10) Patent No.: US 7,837,818 B2
(45) Date of Patent: Nov. 23, 2010

(54) ARTICLE-PACKAGING WRAPPER OF HEAT-SHRINK MATERIAL WITH A PATTERN IN RELIEF

(75) Inventor: Eric Fresnel, Paris (FR)

(73) Assignee: Sleever International Company, Morangis (FR)

( * ) Notice: Subject to any disclaimer, the term of this patent is extended or adjusted under 35 U.S.C. 154(b) by 544 days.

(21) Appl. No.: 11/766,910

(22) Filed: Jun. 22, 2007

(65) Prior Publication Data

US 2007/0240805 A1   Oct. 18, 2007

Related U.S. Application Data

(62) Division of application No. 10/517,959, filed as application No. PCT/FR03/01788 on Jun. 13, 2003, now abandoned.

(30) Foreign Application Priority Data

Jun. 19, 2002   (FR) ................... 02 07550

(51) Int. Cl.
- B29C 65/00 (2006.01)
- B29C 53/00 (2006.01)
- B29C 59/04 (2006.01)
- B32B 37/00 (2006.01)
- B31F 1/07 (2006.01)
- B65B 53/02 (2006.01)
- B65D 65/00 (2006.01)
- B65D 75/00 (2006.01)

(52) U.S. Cl. ............... 156/209; 156/86; 156/203; 53/442; 206/432

(58) Field of Classification Search ............. 156/59, 156/83, 84, 85, 86, 196, 198, 199, 200, 201, 156/202, 203, 204, 209, 212, 213, 215, 217, 156/218, 227, 277, 278, 165; 53/441, 442, 53/585; 206/432; 215/246
See application file for complete search history.

(56) References Cited

U.S. PATENT DOCUMENTS

| | | | | |
|---|---|---|---|---|
| 3,523,052 | A | * | 8/1970 | Bolen ................. 156/521 |
| 3,607,602 | A | * | 9/1971 | Greskiewicz ......... 428/317.1 |
| 3,825,141 | A | * | 7/1974 | Campagna ............ 215/12.2 |

(Continued)

FOREIGN PATENT DOCUMENTS

EP   0537455 A1   4/1993

(Continued)

OTHER PUBLICATIONS

International Search Report, dated Oct. 7, 2003.

*Primary Examiner*—Richard Crispino
*Assistant Examiner*—Brian R Slawski
(74) *Attorney, Agent, or Firm*—McCormick, Paulding & Huber LLP

(57) ABSTRACT

A wrapper for packaging one or more articles, is constituted by a sleeve of heat-shrink plastics material for shrinking onto the article(s) for packaging, said sleeve being made from a film that is folded in half and whose corresponding end zones are united. The wall of the sleeve is embossed at least in part with a predetermined pattern so that said pattern appears in relief on the outside face and/or the inside face of the sleeve and remains after said sleeve has been shrunk onto the article (s) to be packaged.

8 Claims, 3 Drawing Sheets

U.S. PATENT DOCUMENTS

| | | | |
|---|---|---|---|
| 4,018,640 A | * 4/1977 | Amberg | 156/86 |
| 4,690,843 A | 9/1987 | Inagaki | |
| 4,803,829 A | * 2/1989 | Scheidegger | 53/442 |
| 4,990,298 A | * 2/1991 | Young | 264/291 |
| 5,048,572 A | * 9/1991 | Levine | 138/121 |
| 5,642,226 A | * 6/1997 | Rosenthal | 359/619 |
| 5,992,420 A | * 11/1999 | Moriyama | 131/256 |
| 5,992,492 A | * 11/1999 | Huang et al. | 156/494 |
| 6,020,823 A | 2/2000 | DeCicco | |
| 6,254,139 B1 | * 7/2001 | Fresnel | 283/94 |
| 6,857,211 B2 | * 2/2005 | Grasso | 40/310 |
| 6,949,290 B2 | * 9/2005 | Schaeffeler et al. | 428/411.1 |

FOREIGN PATENT DOCUMENTS

| | | | |
|---|---|---|---|
| JP | 59224317 A | * | 12/1984 |
| JP | 62090218 A | * | 4/1987 |
| JP | 01044735 A | * | 2/1989 |
| JP | 08127066 A | * | 5/1996 |

* cited by examiner

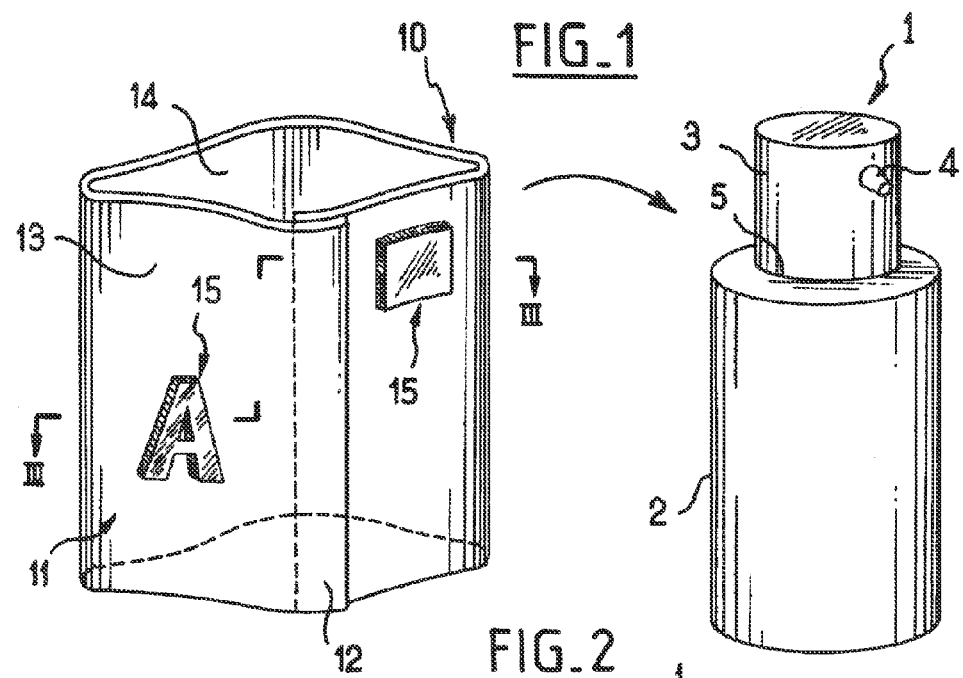
FIG_1
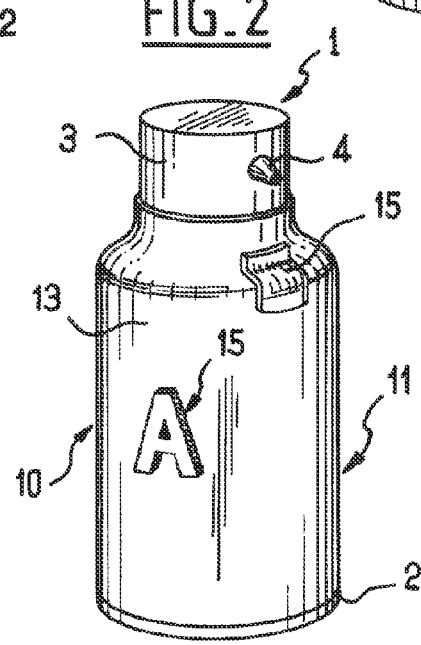
FIG_2
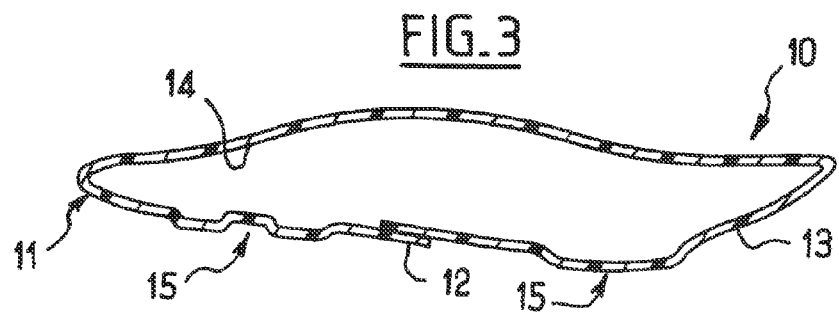
FIG_3

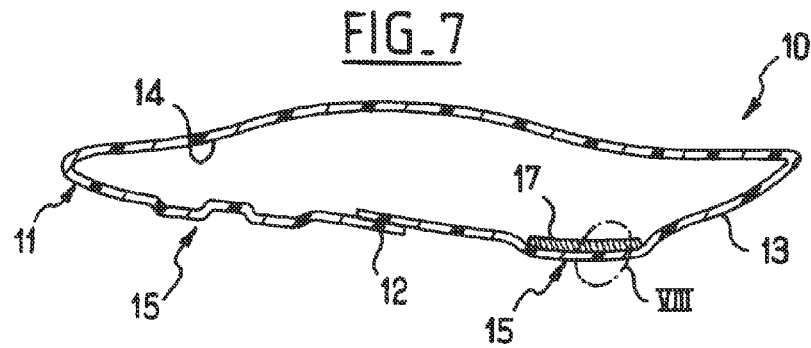
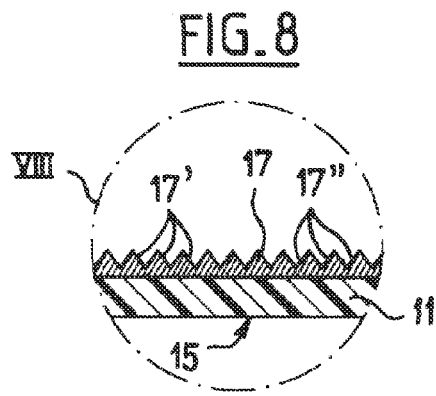
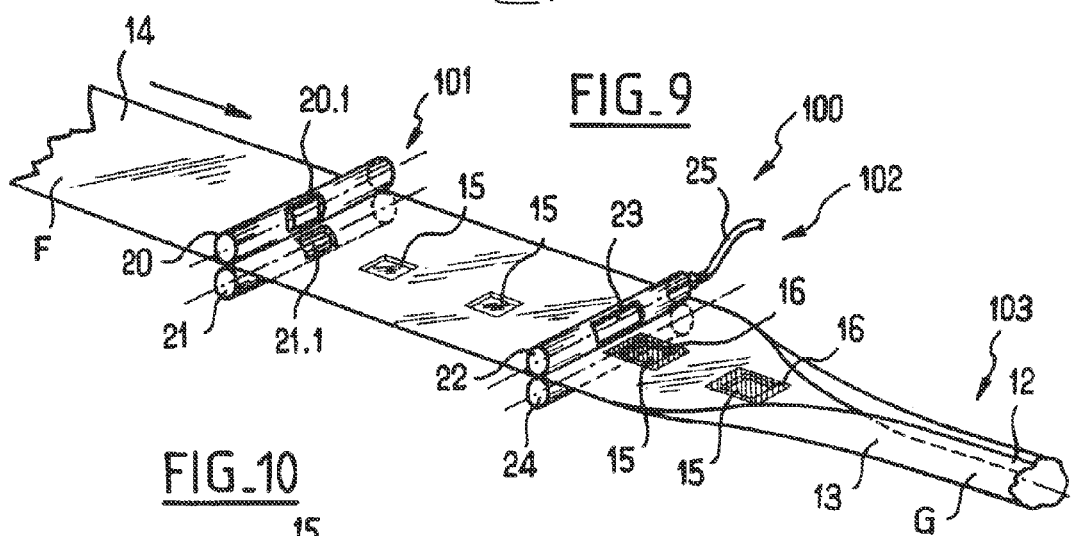
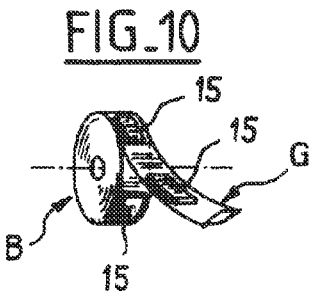

ARTICLE-PACKAGING WRAPPER OF HEAT-SHRINK MATERIAL WITH A PATTERN IN RELIEF

CROSS REFERENCE TO RELATED APPLICATIONS

This application is a Divisional of U.S. application Ser. No. 10/517,959, filed Dec. 14, 2004, which is the National Stage of International Application No. PCT/FR2003/001788, filed Jun. 13, 2003, which claims the benefit of French Patent Application No. 02/07550, filed Jun. 19, 2002. The contents of these applications are hereby incorporated by reference in their entirety.

FIELD OF THE INVENTION

The present invention relates to the field of packaging articles, and more particularly packaging implemented by means of a wrapper constituted by a sleeve of heat-shrink plastic material for shrinking onto the article(s) concerned.

BACKGROUND OF THE INVENTION

The technique of packaging one or more articles using a heat-shrink sleeve made in the form of a sleeve that is engaged over the article(s) to be packaged and that is then heat-shrunk onto said article(s) has already been in use for about thirty years. The technique of heat-shrinking by applying a heat field to the outside of the sleeve in order to shrink the sleeve uniformly onto the article, even when said article is of section that varies greatly, is now thoroughly mastered. As an indication, it is now possible to achieve shrinkage ratios of as much as 70% to 80% in section. Anamorphosis techniques enabling printing to be performed on the sleeve so that the printing remains readable after the sleeve has been shrunk onto an article are also thoroughly mastered, with this being particularly important in the fields of pharmaceuticals and cosmetics.

Until now, printing techniques have been restricted to conventional techniques consisting in applying decoration that presents controlled anamorphosis during shrinkage of the sleeve on the article(s) to be packaged.

The technological background of the invention is illustrated by documents EP-A-0 537 445 and U.S. Pat. No. 6,020,823, which are described briefly below.

Document EP-A-0 537 455 describes registration marking applied to an elastic packaging sheet so as to obtain a pattern (in particular a screen pattern) which remains when the sheet is stretched. Nevertheless, that document relates to thermoplastic sheets which are stapled to pallets, and it does not relate to heat-shrink sleeves.

Document U.S. Pat. No. 6,020,823 describes fastening sound or light-emitting articles to a bottle, by using a heat-shrink sleeve. The sleeve may be of single thickness, in which case the articles are stuck to the inside face of the sleeve, prior to the sleeve being put into place on the bottle and shrunk, or it may have two thicknesses, in which case the articles are sandwiched between two sheets (which may be heat-shrink or otherwise). It should be observed that the relief that is apparent on the outside is no more than the outline of the article that is held captive, as can be seen clearly from FIG. 6.

SUMMARY OF THE INVENTION

An object of the invention is to devise a novel technique enabling printed patterns to be made that can be perceived not only visually from the outside of the sleeve that has been shrunk on the article to be packaged, but that can also be perceived by touch.

Portions in relief are already obtained in strip material in certain fields, but the material used is restricted to inert materials such as paper or flexible metal. No attempt has yet been made to obtain portions in relief on heat-shrink plastics materials, presumably because of a strong prejudice on the part of the person skilled in the art having every reason to believe that a portion in relief made before shrinkage will become attenuated or even disappear completely once the sleeve has been shrunk onto an article. Shrinking the wall of the sleeve exerts tension in a circumferential direction which tends to pull on all zones of the sleeve wall, so it is logical to dispense with forming portions in relief on said sleeves of heat-shrink plastics material.

The present invention comes from an approach that goes against that prejudice, and proposes an article-packaging wrapper constituted by a sleeve of heat-shrink plastics material for shrinking onto the article(s) to be packaged, said sleeve being made from a film folded in half with the corresponding end zones being united, said wrapper being remarkable in that the wall of the sleeve is embossed at least in part with a predetermined pattern so that said pattern appears in relief on the outside and/or inside face of the sleeve and remains after said sleeve has been shrunk onto the article(s) to be packaged.

Embossing a predetermined pattern thus enables relief to be produced that can be perceived on the outside face of the sleeve both visually and by touch.

Advantageously, the film constituting the sleeve is a semi-rigid film including an elastomeric phase in its formulation.

When the article(s) concerned is/are of a shape associated with a greatly varying section, the effect of shrinking the sleeve is to stretch its wall against the outside surface of the article without significantly deforming the embossed pattern. However, as soon as the shrinkage ratio becomes quite high, the wall tension becomes such as to run the risk of significantly affecting the embossed pattern. As a result, in a particular embodiment of the invention, provision is made for the inside and/or outside face of the sleeve to be coated, at least in part, over the embossed pattern in a technical agent that is positioned and registered for the purpose of encouraging the relief to be maintained while said sleeve is shrinking. In particular, the inside and/or outside face of the sleeve should be covered in those of its embossed zones that are concerned by a high shrinkage ratio while said sleeve is being shrunk onto the article(s) to be packaged, in particular when the shrinkage ratio exceeds about 10% to 15%.

The technical agent may be coated on the inside and/or outside face, said technical agent being a thermosetting varnish or the like that locally blocks shrinkage of the sleeve wall at the embossed pattern, or in a variant it may be a thermoswelling varnish or the like that locally pushes away the sleeve wall at the embossed pattern while the sleeve is being shrunk.

It is then advantageous to provide for the thermosetting or thermoswelling technical varnish to be selected so as to be reactivatable at a temperature that is compatible with the temperature range used for heat-shrinking the film constituting the sleeve.

The thermosetting or thermoswelling technical varnish may be deposited on a zone surrounding the embossed pattern, and/or it may be deposited on the inside and/or outside face of the sleeve, in particular in the indentations formed by the embossed pattern.

In a variant, provision can be made for the technical agent to be deposited on the inside or outside face of the sleeve in the indentations formed by the embossed pattern, said technical agent being a rigid or semi-rigid insert. In particular, the above-mentioned insert may present a fine screen on its free face, for example a multiple-diffraction screen of the lens type.

Finally, provision can be made for the inside and/or outside face of the sleeve to present a screen or the like over at least some of the portions in relief formed by the embossed pattern.

The invention also provides a method of manufacturing an article-packaging wrapper presenting one or more of the above-specified characteristics.

In accordance with the invention, the manufacturing method is remarkable in that the film for constituting the heat-shrink sleeve is embossed while flat to have a predetermined pattern, the embossed film then being folded in half so that said pattern appears in relief on the convex outside face and/or the concave inside face of said film, and the corresponding end zones are united.

For implementing the method, it is preferable to use a semi-rigid film including an elastomeric phase in its formulation.

In accordance with a particularly advantageous characteristic of the method, at the location where the pattern is to be embossed or where it has already been embossed, the film is coated on its face that corresponds to the hollow side of the embossing, and/or on the opposite face, with a technical agent that is positioned and registered to encourage the relief to be maintained during shrinkage of the wall of the film.

In a first implementation, the corresponding face of the film is coated in a technical agent constituted by a thermosetting varnish or the like, or a thermoswelling varnish or the like.

The steps of embossing and optionally locally coating in a technical agent are then preferably implemented continuously on the film while it is traveling flat, prior to said film being shaped into a continuous sheath suitable for being stored in the flattened state by being wound onto a reel, the sleeves used for packaging articles being obtained by cutting segments from said continuous sheath.

In another implementation, the corresponding face of the film is covered, in the embossing indentation, in a technical agent constituted by a rigid or semi-rigid insert. Provision can then be made for the free face of said insert to be worked so as to present a fine screen, in particular a multiple-diffraction screen of the lens type.

In which case, the steps of embossing and putting into place the insert(s), and possibly also of working said insert(s), are implemented continuously on the film as it travels flat, prior to said film being shaped into a continuous sheath suitable for being stored in the flattened state by being wound onto a reel, with the sleeve used for article packaging being obtained by cutting segments from said continuous sheath.

Finally, provision can be made for the film while traveling flat to be subjected to having a screen formed therein at the location of at least some of the embossing relief.

BRIEF DESCRIPTION OF THE DRAWINGS

Other characteristics and advantages of the invention appear more clearly in the light of the following description and the accompanying drawings relating to particular embodiments.

Reference is made to the figures, in which:

FIG. 1 shows an article-packaging wrapper having an embossed wall in accordance with the invention, and for placing on an article, which in this case is a perfume spray;

FIG. 2 shows the above wrapper shrunk onto the article, with embossed patterns (in this case a letter A and a square) remaining on the outside face of said wrapper;

FIG. 3 is a cross-section through the wrapper on line III-III of FIG. 1, through the embossed zones of the wall of the film constituting the sleeve;

FIG. 7 is a section view analogous to that of FIG. 3 showing another variant in which the technical agent in the location of the hollow side of the embossed square pattern is constituted by a rigid or semi-rigid insert;

FIG. 8 shows a detail VIII of FIG. 7 on a greatly enlarged scale to show the way the free face of the insert may be screened, in particular with a screen of the lens type;

FIG. 9 is a perspective view of the method of continuously manufacturing a packaging wrapper in accordance with the invention, starting from a film of heat-shrink plastics material traveling flat; and FIG. 10 shows the continuous sheath made in this way stored in a flattened state.

DETAILED DESCRIPTION OF THE INVENTION

Figure 4:
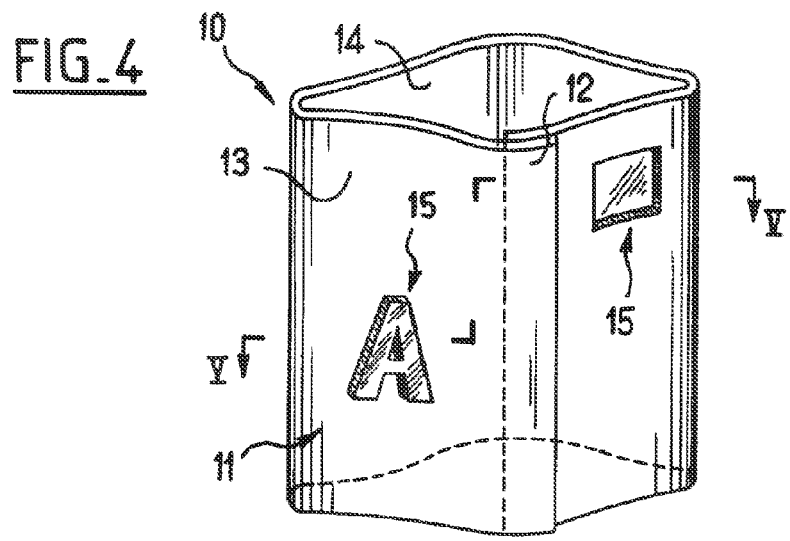
FIG. 4 and FIG. 5 which is a section on V-V show another variant in which the embossed pattern of square shape appears in relief on the inside face of the sleeve.

FIG. 1 shows an article-packaging wrapper in accordance with the invention for packaging an article 1, which in this case is a perfume spray, which comprises a body 2 surmounted by a pushbutton-forming cap 3 fitted with a spray nozzle 4, the circular connection zone referenced 5 corresponding to a large change in section between the body 2 and the cap 3. The packaging wrapper referenced 10 is constituted by a sleeve 11 of heat-shrink plastics material which is open at both ends, said sleeve being shown not as a perfect cylinder, but in the form of an open sheath that has two side folds, as a reminder that this type of sleeve is obtained by cutting segments from a flattened sheath wound on a reel. In conventional manner, the sleeve 11 is made from a continuous sheath, itself obtained by putting the edges of a film that is folded in half into edge-to-edge or edge-on-edge contact with the contacting edges being bonded together, e.g. forming a margin referenced 12. The sleeve as made in this way presents an outside face referenced 13 and an inside face referenced 14. The sleeve 11 is thus made from a film that has been folded in half with the corresponding end zones being united in accordance with a technique that is well known in the art in question.

In accordance with an essential characteristic of the invention, the wall of the sleeve 11 is embossed at least in part with a predetermined pattern 15 so that said pattern appears in relief on the outside and/or inside face 13 and/or 14 of the sleeve 11 and remains there after said sleeve has been shrunk onto the packaged article(s).

Purely by way of illustration, the figure shows an embossed pattern 15 representing the letter A, and an embossed pattern in the form of a square that is offset upwards from said letter, said pattern in this case projecting from the outside face 13 of the sleeve. This embossed pattern 15 can thus readily be perceived both visually and by touch. The section of FIG. 3 shows more clearly how the embossed pattern 15 is arranged, and in the example shown it is obtained (as described below) by the film passing between two embossing rollers presenting patterns matching the desired pattern, said patterns projecting or being recessed, as appropriate.

Figure 5:
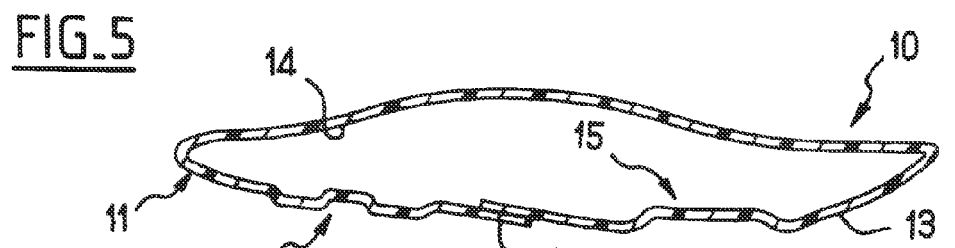

As shown in FIGS. 4 and 5, the embossed pattern 15 may be organized so as to appear in part or in full in relief on the inside face 14 of the sleeve 11. The portion of the embossed pattern 15 which is represented by a square thus appears in relief on the inside face 14, while the portion represented by the letter A appears in relief on the outside face 13.

The sleeve 11 is thus made with its embossed pattern 15 projecting in relief on the outside face 13 and/or on the inside face 14 of said sleeve. The sleeve 11 is subsequently engaged on the article 1, and the sleeved article is passed through a shrinking tunnel (not shown) having the effect of shrinking the wall of the sleeve onto the outside surface of the article, with the final result being as shown in FIG. 2. As can be observed, the embossed pattern 15 remains apparent in relief, in this case on the outside face of the shrunk sleeve, thus remaining in spite of the shrinking of said sleeve, and in spite of the high shrinkage ratio over the connection 5 where the embossed square pattern is located, while the pattern in the form of the letter A is subjected to a smaller amount of stress during shrinking.

When the shape of the article for packaging presents large variations in section, the shrinkage ratio may vary to a very large extent over the sleeve concerned, and said ratio can sometimes reach values as great as 70% or 80%. The higher the shrinkage ratio while the sleeve is being shrunk onto the article, the greater the risk of the embossed pattern 15 being affected by shrinking. Under such circumstances, and in accordance with another important characteristic of the invention, the inside and/or outside face 14 and/or 13 of the sleeve 11 is covered at least in part in the location of the embossed pattern 15 in a technical agent that is positioned and registered so as to facilitate maintenance of the relief during shrinkage of the sleeve. This covering in a technical agent is provided on a priority basis in the location of those embossed zones that are associated with a high shrinkage ratio while said sleeve is being shrunk onto the article(s) to be packaged, and in particular a ratio exceeding about 10% to 15%. Present printing techniques are capable of performing very accurate registration (to within one-tenth of a millimeter), thereby guaranteeing that covering is preformed very accurately in the location of the embossed pattern.

In a first implementation, the technical agent is coated onto the corresponding face of the sleeve, the agent being implemented in the form of a special varnish.

Such coating is shown in FIG. 6 with examples referenced a) to e).

In these figures, there can be seen zones of the embossed pattern 15 presenting portions in relief 15.1, i.e. male portions, on the side of the film that corresponds to one of the faces of the final sleeve, and recessed or female portions 15.2 associated with the opposite face of said sleeve. In the figures, coating with the technical agent is represented by a dashed-line layer 16.

Figure 6A:
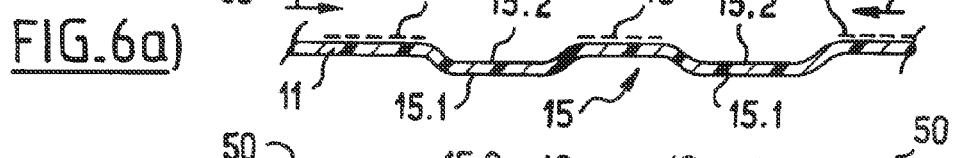
FIG. 6 is a fragmentary section of the wall of the sleeve shown flat, at the location of an embossed pattern which appears on the outside or inside face of the sleeve, with the inside and/or outside face of the sleeve being at least partially coated in a positioned and registered technical agent such as a varnish for encouraging the embossed relief to be maintained while said sleeve is shrinking.

In FIG. 6a), the technical agent 16 is deposited on a zone of the corresponding face that surrounds the embossed pattern 15.

Figure 6B:
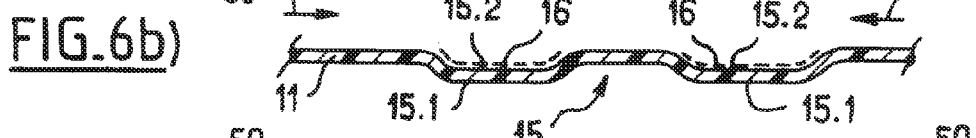

In FIG. 6b), the technical agent 16 is deposited on the same face, but only in the recesses formed by the embossed pattern 15.

Figure 6C:
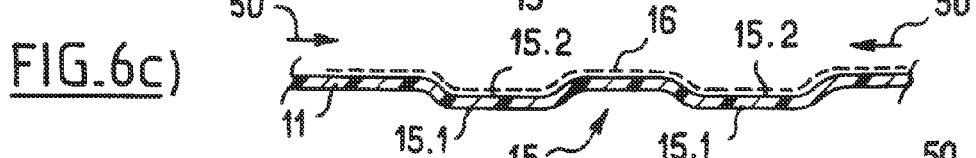

In FIG. 6c), the technical agent 16 is coated both in the recesses formed by the embossed pattern 15, and on the zones surrounding said embossed pattern.

Figure 6D:
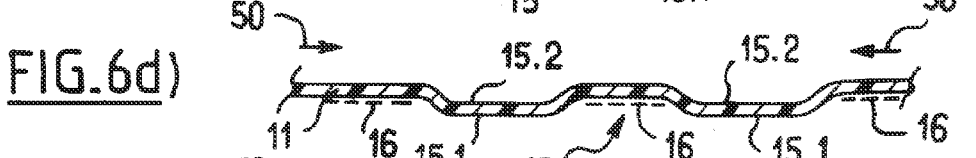
Figure 6E:
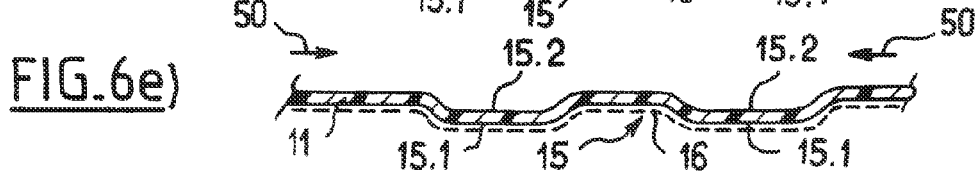

Naturally, the technical agent could also be coated on the other face of the sleeve, as shown in FIGS. 6d) and 6e), either in addition to coating on the preceding face, or instead of such coating. Coating can thus relate to the outside face and/or to the inside face of the sleeve. Nevertheless, coating of the inside face is often preferable insofar as the sleeve is obtained from a continuous sheath which is stored in the flat state, so that the presence of coating on the inside face ensures that said coating is well protected from the outside while the sheath is being handled to be cut into segments constituting individual sleeves, and while the sleeves as cut apart in this way are being put into place.

The coated technical agent 16 may be a thermosetting varnish or the like that serves locally to block shrinkage of the wall of the sleeve 11 in the location of the embossed pattern 15. In a variant, it is possible to use a thermoswelling varnish or ink or the like as the technical agent 16 serving locally to push back the wall of the sleeve 11 in the location of the embossed pattern 15 during shrinkage of the sleeve 11.

Preferably, the thermosetting or thermoswelling technical varnish 16 is selected so as to be reactivatable at a temperature that is compatible with the temperature range used for heat-shrinking the film constituting the sleeve 11.

Local blocking of shrinkage of the sleeve wall makes it possible, with very great accuracy, to preserve the aspect and the shape of the embossed pattern while the wall is being shrunk, even when the shrinkage ratio is very large. The use of a thermosetting varnish or the like thus procures a kind of local gel on the sleeve wall, enabling it to withstand the tensions that act on the wall circumferentially during shrinkage.

The use of a thermoswelling agent or the like achieves much the same result, namely retaining the embossed pattern in relief, but does so by providing localized swelling in the portions in relief so as to maintain said portions in relief during shrinkage. Under such circumstances, the coating should be applied solely to the inside or outside face that presents the recessed portions of the embossed pattern.

The technical varnishes used, regardless of whether they are thermosetting or thermoswelling, can be put into action by any type of external agent, such as heat, irradiation, exposure to ultraviolet radiation (hence the use of the term "or the like" above). When activated by heat, the reactivation temperature should preferably be selected to be below the softening point of the wall of the sleeve so that the varnish comes fully into effect while the sleeve is being shrunk onto the article.

In accordance with another implementation, the technical agent is deposited on the inside face or the outside face of the sleeve in the recesses formed by the embossed pattern, said agent being constituted by a rigid or semi-rigid insert. Such a variant is shown in FIG. 7, where there can be seen an insert 17 whose own rigidity is sufficient to provide the mechanical function of maintaining the embossed pattern during shrinkage of the sleeve, by withstanding the forces exerted in a circumferential direction. The insert 17 may be adhesive, and its thickness may be of millimeter order.

As shown diagrammatically in the detail of FIG. 8, the free face of the insert 17 may present a fine screen, in particular a multiple-diffraction screen of the lens type.

Thus, there can be seen parallel facets 17' and 17" organized in two different directions, thus enabling the optical or movement effect to be obtained that is procured by a lens type screen.

The material constituting the wrapper is preferably a thermoplastic film of a memory material that is mono-oriented or bi-oriented, being made of polystyrene or polypropylene, materials which lend themselves particularly well to deformation. Tests undertaken by the Applicant have shown that excellent results are obtained by using a semi-rigid film including an elastomeric phase in its formulation. Such a material has been found to be extremely favorable for remanance of the embossed pattern once the sleeve has been shrunk onto an article, even for an article presenting large variations in section.

Naturally, the embossed pattern may be of a very wide variety of types, going from figurative representations to texts, as on credit cards, or it could also be in the form of an overall decorative pattern covering nearly all of the sleeve, for the purpose of giving a specific external appearance to the outside wall of the sleeve, e.g. by imitating the appearance of grained leather or of grained paper presenting grains in relief.

Finally, provision can be made for the inside face 14 and/or the outside face 13 of the sleeve 11 to present a screen or the like (e.g. of the lens type) over at least some of the portions in relief formed by the embossed pattern 15 (a variant that is not shown).

The invention also relates to a method of manufacturing an article-packaging wrapper of the above-described type, and reference can be made to FIG. 9 which shows the various steps of the method.

Thus, FIG. 9 shows a film F running continuously while flat through a general processing station 100. The film is preferably a semi-rigid film including in its formulation an elastomeric phase.

The film F begins by passing through an embossing station 101. The film F passes, for example, between two complementary rollers 20 and 21, in this case presenting respectively recesses 20.1 and complementary portions in relief 21.1 which perform localized embossing 15 of the film F as it passes between said rollers which are pressed against each other.

Thereafter, the embossed film F passes through a coating station 102 in which a coating roller 22 presenting active zones 23 locally applies a technical agent 16 locally in registered positions for encouraging retention of the relief during subsequent shrinkage. A backing roller 24 ensures that the coating roller 22 is properly applied, which roller is fed with varnish via an associated pipe 25.

The film F as embossed and locally coated in this way finally reaches a shaping station 103 where the film is shaped into a sheath G by bringing its side edges 12 together and uniting them, e.g. by conventional heat-sealing, with the embossed pattern 15 then appearing in relief on the convex outside face or on the concave inside face, as the case may be.

Thus, and in accordance with the invention, manufacturing can be performed continuously with the film F that is to constitute the heat-shrink sleeve 11 being embossed while flat with a predetermined pattern 15, and the embossed film F subsequently being folded in half so as to cause said pattern to appear in relief on the convex outside face 13 and/or on the concave inside face 14 of the film, with the edge zones 12 concerned being united.

Prior to being shaped into a continuous sheath, the film F may optionally be coated, preferably in the location of an already-embossed pattern 15, on the face 14 of the film that corresponds to the hollow sides of the embossing and/or on the opposite face, in a technical agent 16 that is put into a registered position that encourages retention of the relief during shrinkage of the wall of the film.

In a variant, provision can be made for the coating step (station 102) to be performed prior to the embossing step (station 101).

The steps of embossing and optionally local coating in a technical agent in a registered position are thus implemented continuously on the film as it travels in the flat condition prior to said film being shaped into a continuous sheath G.

If coating of the film in a technical varnish in a registered position is replaced by depositing a rigid or semi-rigid insert, then a specific station (not shown) is provided for positioning the insert(s) upstream or downstream from the embossing station, optionally together with a station for applying a screen to the continuously traveling inserts (e.g. comprising rollers having a laser-etched outside face for imprinting microgrooves in a predetermined pattern), in particular for the purpose of implementing multiple-diffraction screens of the lens type. In this case also, the method is implemented continuously on the film while it travels flat, prior to said film being shaped into a continuous sheath G.

Finally, provision can be made for a screen or the like to be applied to the film in the locations of at least some of the embossed patterns in relief. Such screening, e.g. of the lens type, can be implemented in the embossing station, with the work taking place on the face opposite from the face that co-operated with the embossing tool.

As shown in FIG. 10, the continuous sheath G can be stored in the flat state by being wound onto a reel B, the sleeves 11 that are used for packaging articles then being obtained by cutting segments from said continuous sheath.

This thus provides a packaging wrapper presenting printed patterns which can be perceived both visually and by touch on the outside of the wrapper after it has been shrunk onto an article, and in association with articles having a very wide variety of shapes, even shapes that include very large variations in section.

This makes it possible to envisage using techniques that are well mastered for embossing materials that are inert such as paper and metal by passing them between complementary shapes, which techniques can be implemented with extremely accurate registration, to within less than one-tenth of a millimeter. The invention thus makes it possible to implement embossing that is extremely accurate and in a wide variety of shapes, while nevertheless being certain that the embossed patterns will remain on the outside and/or inside face of the wrapper after said wrapper has been shrunk onto the article(s) to be packaged.

The invention is not limited to the embodiments described above, but on the contrary covers any variant using equivalent means to implement the essential characteristics specified above.

What is claimed is:

1. A method of manufacturing a wrapper for packaging one or more articles, the wrapper including a sleeve of heat-shrink plastics material for shrinking onto the article(s) for packaging, the sleeve being made from a film, wherein the wall of the sleeve is embossed at least in part with a predetermined pattern so that the pattern appears in relief on the outside face and/or the inside face of the sleeve and remains after the sleeve has been shrunk onto the article(s) to be packaged, the method comprising steps of:

embossing the film while flat with the pattern;

subsequently folding the embossed film so that the pattern appears in relief on a convex outside face and/or on a concave inside face of the film; and uniting end zones of the film to form the sleeve, wherein the film is coated, in a location of the pattern that is to be embossed or that has already been embossed, on the face of the film that corresponds to the recessed side of the embossing and/or on the opposite face, with a technical agent that retains the relief during shrinkage of the wall of the film.

2. The method according to claim 1, wherein a semi-rigid film is used that includes an elastomeric phase in its formulation.

3. The method according to claim 1, wherein the technical agent is a thermosetting varnish or a thermoswelling varnish.

4. The method according to claim 1, wherein the steps of embossing and coating with a technical agent are implemented continuously on the traveling film while it travels flat, prior to said film being shaped into a continuous sheath that can be stored in the flattened state by being wound onto a reel, the sleeves used for packaging article(s) being obtained by cutting said continuous sheath into segments.

5. The method according to claim 1, wherein the face concerned of the film is coated in the recesses of the embossing in a technical agent constituted by a rigid or semi-rigid insert.

6. The method according to claim 5, wherein the free face of the rigid or semi-rigid insert is worked to have a fine screen, in particular a multiple-diffraction screen of lens type.

7. The method according to claim 5, wherein the step of embossing and of putting the insert(s) into place, and also of working said inserts, are implemented continuously on the film traveling while flat, prior to said film being shaped into a continuous sheath storable in the flattened state by being wound on a reel, the sleeves used for packaging article(s) being obtained by cutting said continuous sheath into segments.

8. The method according to claim 4, wherein the film while traveling flat is subjected, in the location of at least some of the embossed patterns in relief, to screening.

\* \* \* \* \*